UNITED STATES PATENT OFFICE.

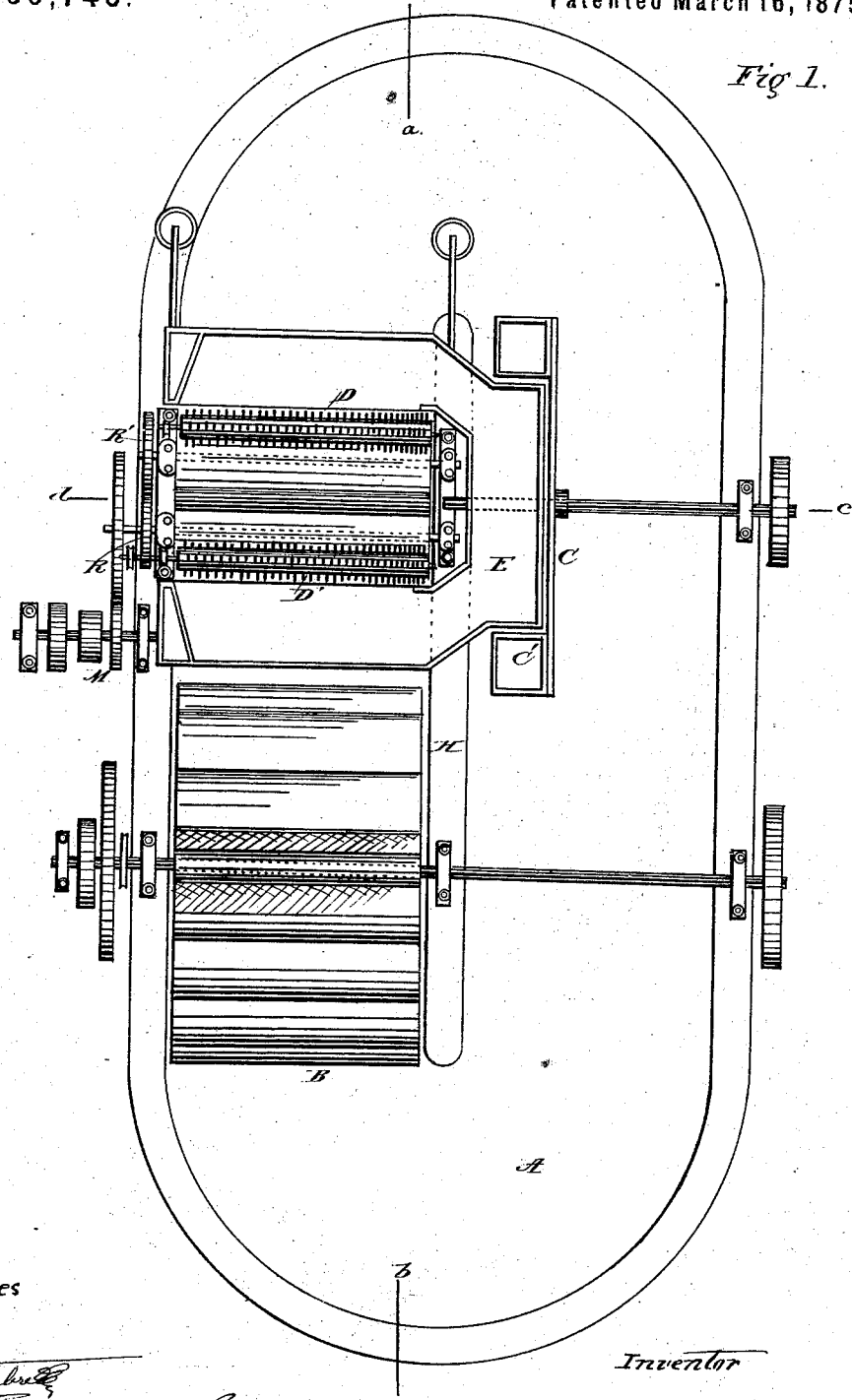

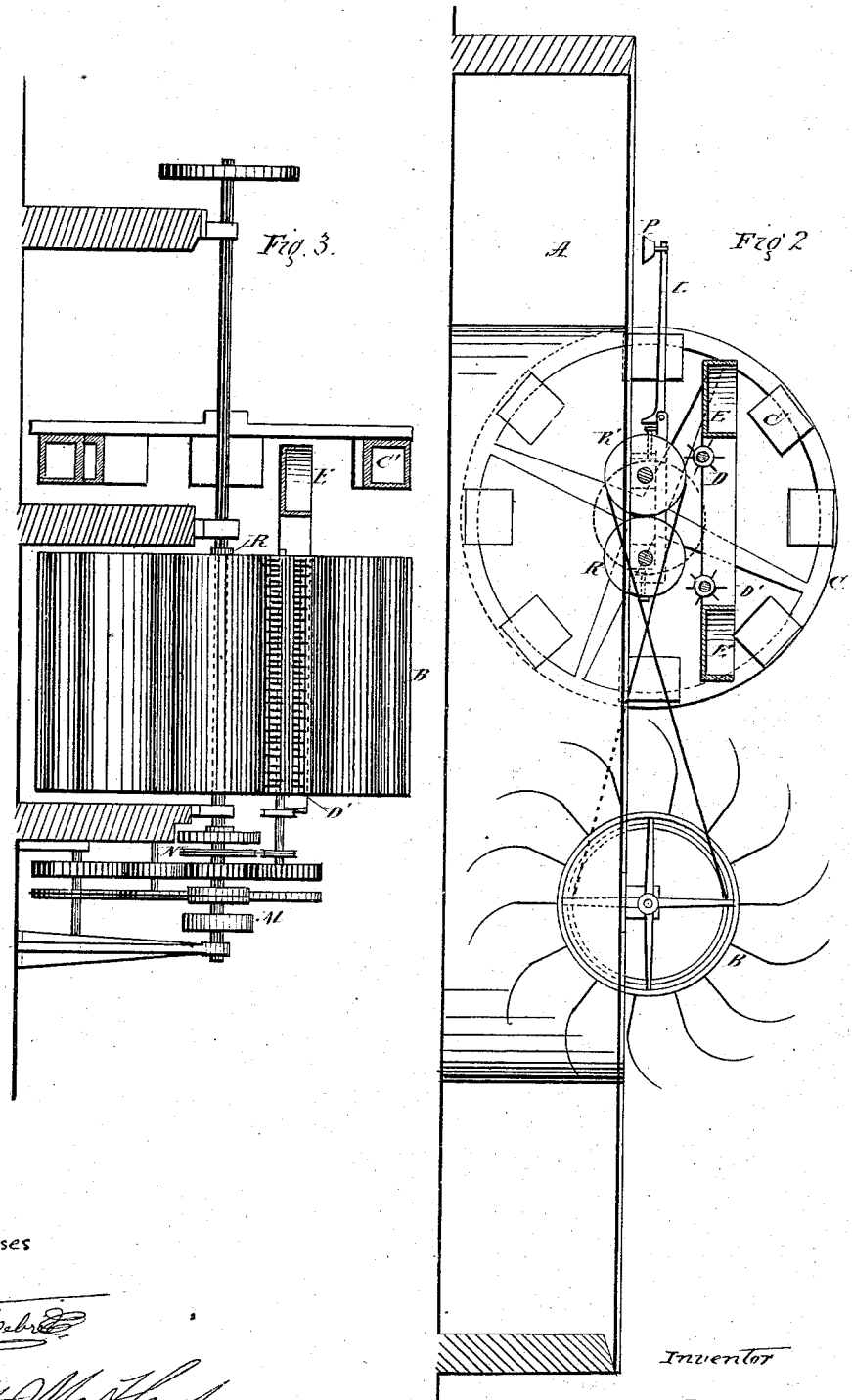

MARCELLIN RENÉ BOUJU, OF PARIS, FRANCE.

IMPROVEMENT IN PAPER-PULP ENGINES.

Specification forming part of Letters Patent No. 160,746, dated March 16, 1875; application filed November 17, 1874.

*To all whom it may concern:*

Be it known that I, MARCELLIN RENÉ BOUJU, of Paris, France, have invented certain Improvements in Apparatus for Manufacturing Paper-Pulp from fibrous plants and wood, of which the following is a specification:

The object of this invention is the reduction to pulp of fibrous plants and shrubs and wood for the manufacture of paper—as, example, the *hibiscus esculentum*—and at the same time to extract the resinous gummy matter or dextrine to be afterward employed in gumming the paper.

An apparatus embodying my invention is shown in plan by Figure 1, Sheet 1. Figs. 2 and 3, Sheet 2, are sections of Fig. 1, taken at $a\ b$ and $c\ d$, respectively.

It consists of a basin or trough, A, of masonry, metal, or wood, in the interior of which is a pan, also in masonry, metal, or wood, H, and running longitudinally parallel with the sides of the basin A. On this pan, and on the sides of the basin, the axes of the crushing-cylinders R R′, governing-pulley M, and transmitting-pulley N rest, which will be hereafter mentioned. The basin is supplied with water for the crushing operation at such a height or level that the surface of the liquid should be below the axes of the wheels and cylinders. A winged wheel, B, is placed in the pan A, and is kept in continual motion during the crushing process. Its object is to displace the matter contained in the trough A, and to keep it in motion, so that it may be readily taken up by the cups C′ of the cup-wheel C. The substance to be employed in the manufacture of the pulp is set in motion in the liquid contained in the basin. The cups C′ take it alternately and continuously, to then empty it into the distributing-channel E, which is gently inclined, so that when once placed therein it is drawn along with the liquid toward the delivering-cylinders D D′, whose axes also rest on either side of the pan H. On reaching the cylinders D D′, which are provided with flies or projections, the matter is distributed by them by their continuous revolution, the flies only allowing the proper quantity to pass at a time, which is then crushed by the cylinders R R′, which are arranged below the distributing-rollers D D′. The crushers are of cast-iron or suitable metal, with sharp grooves, and rest by their axes on movable rollers on the pan H. A pressure-lever, L, keeps the rollers always apart, while at the same time leaving them sufficient play in the event of the matter being cumbersome. A counter-weight, P, is placed at the end of the lever for regulating the crushing-cylinders R R′, so as to maintain them constantly in their normal position.

The apparatus described may be set in motion by steam, hydraulic, or other power.

After the matter has been sufficiently crushed the liquid is poured into another basin or trough expressly arranged for the purpose. The matter is then removed from the crushing-basin, and the operation is then completed as is customary in the manufacture of pulp by the ordinary process—that is to say, lixiviation or steeping in lye, washing, bleaching, and so on—preparatory to being made into paper. The liquid poured into the second basin is precipitated to withdraw the resinous gum from the plant, or *hibiscus esculentum*, the separation is readily effected, and the gum obtained serves for gumming the paper.

I claim as my invention—

The combination, in a pulp-making machine substantially as described, of the winged wheel B, the cup-wheel C, and the delivering-cylinders, with projections D D′, as and for the purposes herein set forth.

MARCELLIN RENÉ BOUJU.

Witnesses:
 E. HÉBRÉ,
 ROBT. M. HOOPER.